United States Patent [19]

Lan

[11] Patent Number: 5,075,826
[45] Date of Patent: Dec. 24, 1991

[54] AUXILIARY BRAKE LAMP

[76] Inventor: Ching-Hwei Lan, No. 9, Alley 1, La. 458, Yuang Ho Rd., Chung Ho City, Taiwan

[21] Appl. No.: 628,553

[22] Filed: Dec. 17, 1990

[51] Int. Cl.⁵ .............................................. B60Q 1/44
[52] U.S. Cl. .................................. 362/83.3; 362/27; 362/31; 362/61; 40/546
[58] Field of Search ........................ 362/26, 27, 31, 61, 362/83.3, 293, 812; 40/546

[56] References Cited

U.S. PATENT DOCUMENTS

| | | | |
|---|---|---|---|
| 2,247,969 | 7/1941 | Stewart | 362/31 |
| 4,806,903 | 2/1989 | Rust | 362/31 |

FOREIGN PATENT DOCUMENTS 8805589  7/1988  Australia ............................... 40/546

OTHER PUBLICATIONS

Article, Henry Pearson, "Piping Light with Acrylic Materials", *Modern Plastics*, 6/1946, pp. 123-126.

*Primary Examiner*—Ira S. Lazarus
*Assistant Examiner*—Leonard Heyman
*Attorney, Agent, or Firm*—Browdy and Neimark

[57] ABSTRACT

An auxiliary brake lamp and night lamp mounted on the deck above the trunk and behind the car's rear seat. The lamp has an opaque, hollow light seat which is made with two penetrating flutes for engaging two transparent boards in its upper part. A PC board is housed in the light seat beneath both penetrating flutes and has two rows of small bulbs which emit light into the penetrating flutes and the lower edges of the engaged boards. One of the boards is crimson, flat and has a plurality of parallel grooves on its back side which causes light passing through the board's edge to collectively form a warning on its front side. The second board is colorless, flat and has a plurality of parallel grooves on its back side which causes light passing through the board's edge to form a decorative pattern on its front side.

1 Claim, 3 Drawing Sheets

A-A SECTION

AUXILIARY BRAKE LAMP

FIELD OF THE INVENTION

The present invention is directed to a auxiliary brake lamp. More particularly, the invention has a housing for light bulbs that emit light into the edges of transparent boards seated on the housing. The transparent boards have a plurality of parallel grooves on their back sides which reflect the light emitted from within the housing out the front face of the boards in a strong, equally distributed illumination.

BACKGROUND OF THE INVENTION

The conventional auxiliary brake lamp, is installed on the deck above the trunk and behind the car's rear seat. This type of lamp is generally connected in parallel with the brake lamp's power source, so that it will simultaneously emit a red light when braking the car. The drivers behind are alerted by such lamps and are thereby better able to avoid collision or accidents. The conventional auxiliary brake lamp simply consists of an opaque casing in which a small bulb is housed with a red transparent cover mounted as a front face. In use, the red light is focused in the central area of the cover and the surrounding areas are increasingly dimmer. This unequal distribution of light results in a display which may not serve the intended purpose of alerting other drivers.

OBJECTIVE OF THE INVENTION

This invention provides another kind of auxiliary brake lamp to overcome the above identified problems. It uses a few small light bulbs to emit light beams into the edge of a transparent board which, in consequence of specifically formed surface grooves reflect very bright light out perpendicular to the front face of the boards.

SUMMARY OF THE INVENTION

The structure of an auxiliary brake lamp comprises an opaque, hollow light seat which has two penetrating flutes for engaging two transparent boards in its upper part. A PC board is housed in the light seat beneath both penetrating flutes and has two rows of small bulbs which emit light into the penetrating flutes and the lower edges of the boards. The invention has a brake transparent board which is crimson, flat and has a plurality of parallel grooves on its back side which causes light passing through the board's edge to collectively form a warning and a colorless, flat nighttime transparent board also having a plurality of parallel grooves on its back side which causes light passing through the board's edge to form a decorative pattern. The invention is intended to be installed on the inside deck of the trunk and behind the car's rear seat, or alternatively on the inside of a windshield. The device will work simultaneously with the car's brake lamp or nighttime lamps by emitting light at the same time as either the brake lamp or the nighttime lamps.

SPECIFIC DESCRIPTION

Figure 1:
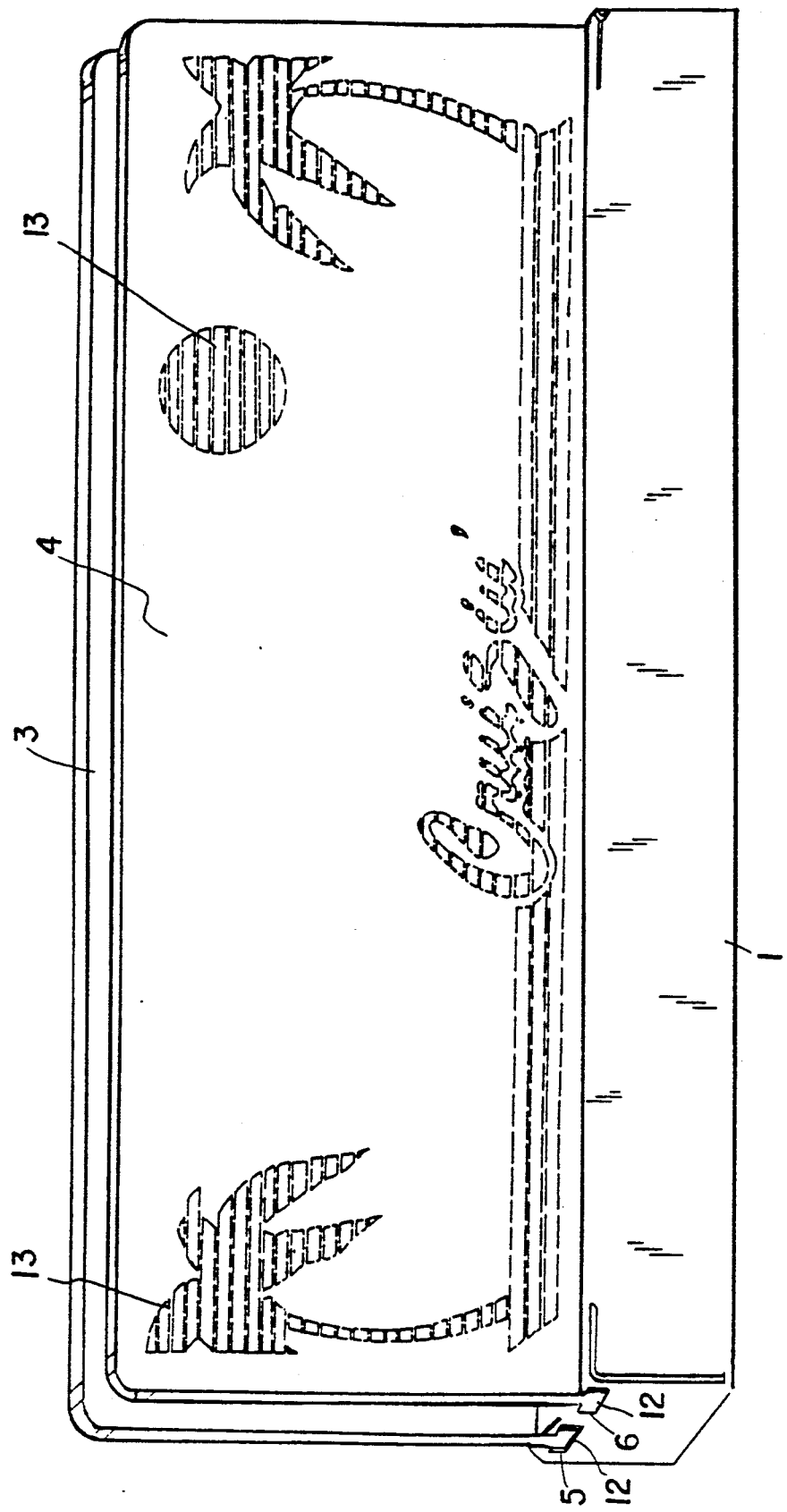
FIG. 1 is a perspective front view of a preferred embodiment of this invention.
Figure 2:
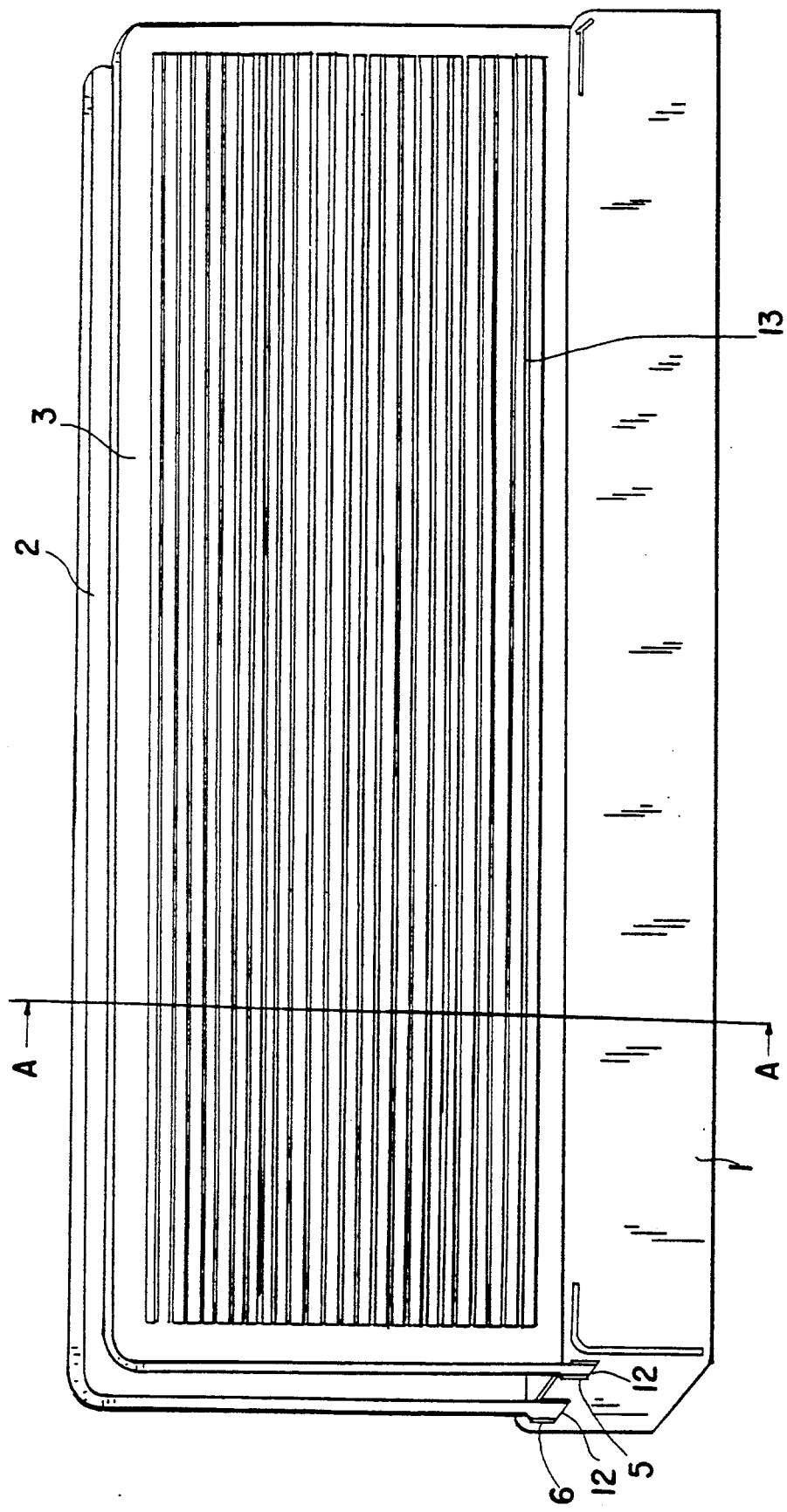
FIG. 2 is a perspective back view thereof.
Figure 4:
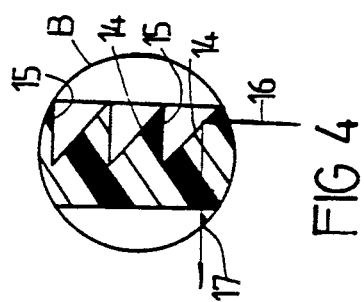
FIG. 4 is an enlarged view of B part in FIG. 3.
Figure 3:
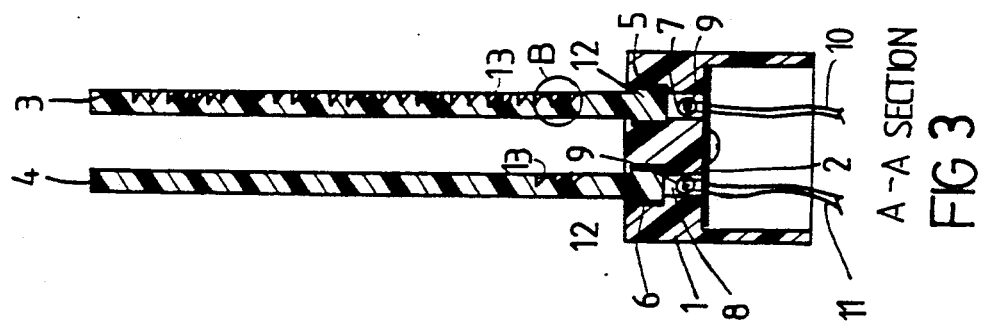
FIG. 3 is a sectional view taken along A—A in FIG. 2.

As FIGS. 1-3 show, this invention comprises a light seat 1, a PC board 2, a brake transparent board 3 and a nighttime transparent board 4. The light is formed as a hollow opaque casing, which is rectangular or other suitable shape and substantially equal in length to transparent boards 3, 4. Two penetrating flutes 5, 6 are provided on the upper portion of seat 1 for engaging transparent boards 3, 4. Beneath penetrating parts 5, 6 a PC board 2 with two rows of small bulbs 9 is positioned in slots 7, 8 to emit light into flutes 5, 6 respectively. In this way, the small bulbs 9 emit light directly into the respective lower edges of transparent boards 3, 4. By virtue of a plurality of grooves having two sides intersecting at a 45-degree angle on either back side of transparent boards 3, 4, the light emitted into the lower edges of boards 3, 4 is brightly reflected out of the front face of boards 3, 4 in a strong, equally distributed illumination as further explained below.

As shown in FIG. 3, PC board 2, which is positioned beneath penetrating flutes 5, 6, has two rows of small bulbs housed in slots 7, 8 so as to emit light into penetrating flutes 5, 6. The small bulbs 9 in slot 7, have a power lead 10 making a parallel connection with the power source for the brake lamp. This results in emission of light into flute 5 simultaneously with the brake lamp. Likewise, linked to small bulbs 9 in slot 8, is a power lead 11 connected in parallel with the power source of the nighttime lamps, so that emission of light into flute 7 occurs when activating the nighttime lamps.

As shown in FIG. 3, brake transparent board 3 is flat, crimson and provided with an engaging block 12 at its lower end thereof to insert into penetrating flute 5 so as to be engaged in the upper part of light seat 1. The back of brake transparent board 3 is made with a plurality of parallel grooves 13 to result in light beams being emitted through the front face of the board. The grooves may cover the entire area of the back side, or collectively form a pattern, for example, the word "STOP" or other warning word or any other preferred word. Each groove 13 consists of two side walls 14, 15. The side wall 14 which is closest to the light source is formed at a 45-degree angle to the back surface of the board while the second side wall 15 is formed at a 90-degree angle to the surface of the board. As the direction of arrow 16 indicates when the light beams strike the 45-degree interface they make a 90-degree turn and are emitted out perpendicular to the transparent board's front face, as arrow 17 indicates. This produces an enormous amount of brightness in grooves 13.

In comparison to brake board 3, nighttime transparent board 4, is colorless, flat, and is also provided with a plurality of parallel grooves 13 which function as described above but form a decorative pattern to obtain a decorative effect. Since the grooves 13 of the nighttime transparent board 4 are identical to grooves 13 of the brake transparent board 3 in structure and function, further description is unnecessary.

The device is used by mounting light seat device on the deck above the trunk and behind the car's rear seat. Alternatively, it could also be mounted on the inside of the windshield by means of use of suction discs (not shown) and connected to angle parts of the nighttime transparent board's front face.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

I claim:

1. An auxiliary brake lamp comprising, an opaque, hollow rectangular seat having two penetrating flutes on an upper face of said seat, a flat, transparent, crimson brake board having a length substantially equal to the length of said seat, a flat, transparent, colorless night lamp board having a length substantially equal to the length of said seat, a lower edge of said brake board and a lower edge of said lamp board respectively engaged in one of each of said two penetrating flutes of said seat, said seat having two longitudinal slots respectively located below and in communication with each of said two penetrating flutes, a PC board having two rows of small light bulbs respectively housed in each of said two longitudinal slots, said brake board and said night lamp board each having a plurality of parallel grooves on a respective back side, said grooves having two side walls, a side wall of said side walls closest to a corresponding row of small light bulbs of said two rows of small light bulbs being at a 45-degree angle to said respective back side, the other side wall of said side walls being at a 90-degree angle to said respective back side, wherein light emitted by said two rows of small light bulbs passes respectively through said lower edge of said brake and lamp board and exits perpendicularly through a front side of said brake an lamp board brightly displaying a pattern created by said plurality of grooves.

* * * * *